US012677219B2

(12) United States Patent
Ujikawa et al.

(10) Patent No.: US 12,677,219 B2
(45) Date of Patent: Jul. 7, 2026

(54) TRANSMISSION SYSTEM, ELECTRIC POWER CONTROL APPARATUS, ELECTRIC POWER CONTROL METHOD AND PROGRAM

(71) Applicant: NTT, Inc., Tokyo (JP)

(72) Inventors: Hirotaka Ujikawa, Musashino (JP); Tatsuya Shimada, Musashino (JP); Yoshihito Sakai, Musashino (JP); Kenji Miyamoto, Musashino (JP); Yuka Okamoto, Musashino (JP)

(73) Assignee: NTT, Inc., Tokyo (JP)

( * ) Notice: Subject to any disclaimer, the term of this patent is extended or adjusted under 35 U.S.C. 154(b) by 286 days.

(21) Appl. No.: 18/699,762

(22) PCT Filed: Oct. 11, 2021

(86) PCT No.: PCT/JP2021/037620
§ 371 (c)(1),
(2) Date: Apr. 9, 2024

(87) PCT Pub. No.: WO2023/062697
PCT Pub. Date: Apr. 20, 2023

(65) Prior Publication Data
US 2024/0414646 A1    Dec. 12, 2024

(51) Int. Cl.
*H04W 52/02* (2009.01)

(52) U.S. Cl.
CPC .............................. *H04W 52/0216* (2013.01)

(58) Field of Classification Search
None
See application file for complete search history.

(56) References Cited

U.S. PATENT DOCUMENTS

2021/0136790 A1* 5/2021 Bidkar ................. H04W 72/569
2024/0098773 A1* 3/2024 Soldati .................. H04L 1/0023

OTHER PUBLICATIONS

IEEE Standard 802.3az, "Local and metropolitan area networks—Specific requirements—Part 3: Carrier Sense Multiple Access with Collision Detection (CSMA/CD) Access Method and Physical Layer Specifications, Amendment 5: Media Access Control Parameters, Physical Layers, and Management Parameters for Energy-Efficient Ethernet", Oct. 27, 2010.

(Continued)

*Primary Examiner* — Derrick W Ferris
(74) *Attorney, Agent, or Firm* — Harness, Dickey & Pierce, PLC

(57) ABSTRACT

A first transmission apparatus receives a data signal transmitted by a communication apparatus from a lower transmission apparatus sets the received data signal in a data unit, and transmits the data unit. A second transmission apparatus receives the data unit transmitted by the first transmission apparatus. An electric power controller calculates an arrival start timing that is a timing at which the data unit including a data signal transmitted from a communication apparatus starts to arrive at the second transmission apparatus on a basis of a code rate and a size of a data transmission block used when the communication apparatus transmits the data signal, and performs control such that a sleep state of a signal processor that performs processing on the data unit in the second transmission apparatus is ended before the arrival start timing.

8 Claims, 13 Drawing Sheets

(56)                    References Cited

OTHER PUBLICATIONS

IEEE Standard 802.3bj-2014, "IEEE Standard for Ethernet, Amendment 2 : Physical Layer Specifications and Management Parameters for 100 GB/s Operation Over Backplanes and Copper Cables", Jun. 12, 2014.
"5G wireless fronthaul requirements in a passive optical network context", ITU-T Series G Supplement 66, Sep. 2020.

* cited by examiner

FIG. 6

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | | | 1 |
| 30 | | reserved | 2 |
| 31 | | | 3 |

FIG. 7

| MCS Index | $I_{TBS}$ | Modulation | TBS 100 PRBs | User Data 100 PRBs | Code Rate |
|---|---|---|---|---|---|
| 0 | 0 | QPSK | 2,792 | 30,000 | 0.094 |
| 1 | 1 | QPSK | 3,624 | 30,000 | 0.122 |
| 2 | 2 | QPSK | 4,584 | 30,000 | 0.154 |
| 3 | 3 | QPSK | 5,736 | 30,000 | 0.192 |
| 4 | 4 | QPSK | 7,224 | 30,000 | 0.242 |
| 5 | 5 | QPSK | 8,761 | 30,000 | 0.293 |
| 6 | 6 | QPSK | 10,296 | 30,000 | 0.344 |
| 7 | 7 | QPSK | 12,216 | 30,000 | 0.408 |
| 8 | 8 | QPSK | 14,112 | 30,000 | 0.471 |
| 9 | 9 | QPSK | 15,840 | 30,000 | 0.529 |
| 10 | 9 | 16 QAM | 15,840 | 60,000 | 0.264 |
| 11 | 10 | 16 QAM | 17,658 | 60,000 | 0.295 |
| 12 | 11 | 16 QAM | 19,848 | 60,000 | 0.331 |
| 13 | 12 | 16 QAM | 22,920 | 60,000 | 0.382 |
| 14 | 13 | 16 QAM | 25,456 | 60,000 | 0.425 |
| 15 | 14 | 16 QAM | 28,336 | 60,000 | 0.473 |
| 16 | 15 | 16 QAM | 30,576 | 60,000 | 0.510 |
| 17 | 15 | 64QAM | 30,576 | 90,000 | 0.340 |
| 18 | 16 | 64QAM | 32,856 | 90,000 | 0.365 |
| 19 | 17 | 64QAM | 36,696 | 90,000 | 0.408 |
| 20 | 18 | 64QAM | 39,232 | 90,000 | 0.436 |
| 21 | 19 | 64QAM | 43,816 | 90,000 | 0.487 |
| 22 | 20 | 64QAM | 46,888 | 90,000 | 0.521 |
| 23 | 21 | 64QAM | 51,024 | 90,000 | 0.567 |
| 24 | 22 | 64QAM | 55,056 | 90,000 | 0.612 |
| 25 | 23 | 64QAM | 57,336 | 90,000 | 0.637 |
| 26 | 24 | 64QAM | 61,664 | 90,000 | 0.685 |
| 27 | 25 | 64QAM | 63,776 | 90,000 | 0.709 |
| 28 | 26 | 64QAM | 75,326 | 90,000 | 0.837 |

FIG. 9

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 12960 | 13536 | 13536 | 14112 | 14112 |
| 15 | 12576 | 12960 | 12960 | 13536 | 13536 | 14112 | 14688 | 14688 | 15264 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 22152 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 27376 |
| 23 | 23688 | 24496 | 24496 | 25456 | 25456 | 26416 | 27376 | 27376 | 28336 | 28336 |
| 24 | 25456 | 25456 | 26416 | 26416 | 27376 | 28336 | 28336 | 29296 | 29296 | 30576 |
| 25 | 26416 | 26416 | 27376 | 28336 | 28336 | 29296 | 29296 | 30576 | 31704 | 31704 |
| 26 | 30576 | 30576 | 31704 | 32856 | 32856 | 34008 | 35160 | 35160 | 36696 | 36696 |

FIG. 10

FIG. 13
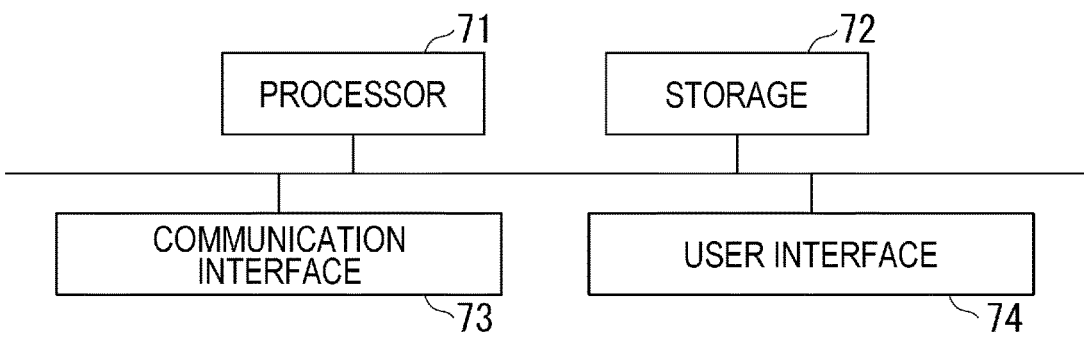
FIG. 14
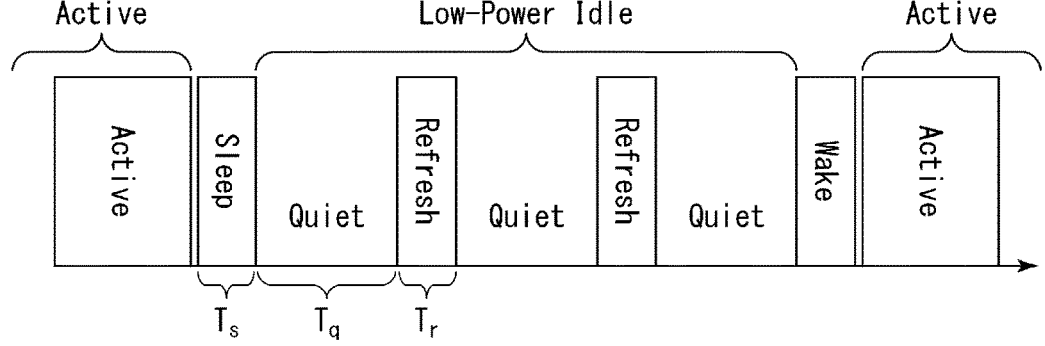
FIG. 15
| Active | Fast wake signaling | Idle (or wake) | Active |

TRANSMISSION SYSTEM, ELECTRIC POWER CONTROL APPARATUS, ELECTRIC POWER CONTROL METHOD AND PROGRAM

CROSS-REFERENCE TO RELATED APPLICATIONS

This application is a 371 U.S. National Phase of International Application No. PCT/JP2021/037620, filed on Oct. 11, 2021. The entire disclosure of the above application is incorporated herein by reference.

TECHNICAL FIELD

The present invention relates to a transmission system, an electric power control apparatus, an electric power control method and a program.

BACKGROUND ART

As a technique for saving power of a transmission apparatus, there is a technique using low power idle (LPI) (see, for example, Non Patent Literature 1). FIG. 14 is an example of the LPI. In power saving by the LPI, transition between a Quiet state and a Refresh state is periodically repeated after a Sleep state. Then, in a case where communication is determined to be started, the transmission apparatus transitions to an Active state through a Wake state, and then resumes the communication. In the LPI, for example, the maximum value and the minimum value of each of a time $T_s$ of the Sleep state, a time $T_q$ of the Quiet state, and a time $T_r$ of the Refresh state are determined for each type of physical layer such as 100BASE-TX, 1000BASE-T, XGXS(XAUI), and 10GBASE-KX4.

As another power saving technique, there is a technique using fast wake (see, for example, Non Patent Literature 2). As illustrated in FIG. 15, in the power saving using the fast wake, a time during which a transmission apparatus stops is shorter than that in the LPI. Therefore, delay until the transmission apparatus returns from a power saving state (Fast wake signaling) to the Active state is small.

On the other hand, there is cooperative dynamic bandwidth allocation (CO-DBA) in which communication delay of a passive optical network (PON) that relays data of a radio system is reduced using scheduling information of the radio system (see, for example, Non Patent Literature 3). In the CO-DBA, the radio system notifies determined scheduling information to an optical line terminal (OLT) in advance. The scheduling information describes when and which user terminal transmits uplink data. The OLT allocates a communication band to an optical network unit (ONU) on the basis of the scheduling information in the notification. As a result, a time during which the ONU waits for bandwidth allocation is reduced. Therefore, communication delay in a case where data of the radio system is transferred between the OLT and the ONU is reduced.

CITATION LIST

Non Patent Literature

Non Patent Literature 1: IEEE Standard 802.3az, "Local and metropolitan area networks—Specific requirements—Part 3: Carrier Sense Multiple Access with Collision Detection (CSMA/CD) Access Method and Physical Layer Specifications, Amendment 5: Media Access Control Parameters, Physical Layers, and Management Parameters for Energy-Efficient Ethernet", 27 Oct. 2010.

Non Patent Literature 2: IEEE Std 802.3bj-2014, "IEEE Standard for Ethernet, Amendment 2: Physical Layer Specifications and Management Parameters for 100 Gb/s Operation Over Backplanes and Copper Cables", Jun. 12, 2014

Non Patent Literature 3: "5G wireless fronthaul requirements in a passive optical network context", ITU-T Series G Supplement 66, September 2020

SUMMARY OF INVENTION

Technical Problem

In the technique of Non Patent Literature 1, as illustrated in FIG. 14, in a case where a frame arrives in the Quiet state, the transmission apparatus transitions to the Wake state after the end of the Quiet period. The transmission apparatus processes the arrived frame after the end of the Wake state. Therefore, delay corresponding to the total of the Quiet time and the Wake time occurs at the maximum. In the technique of Non Patent Literature 2, the delay is reduced as compared with the technique of Non Patent Literature 1, but the effect of power reduction is small.

In both the techniques of Non Patent Literature 1 and Non Patent Literature 2, a timing at which traffic arrives at the transmission apparatus is unknown. Therefore, in a case where traffic arrives at the transmission apparatus during power saving, the traffic is actually detected after the transmission apparatus enters a state of being able to detect the traffic. The transmission apparatus transitions to the Active state after detection. Therefore, either the delay time or the power saving effect is sacrificed.

On the other hand, in the technique of Non Patent Literature 3, scheduling information obtained in advance is not used for power reduction of the transmission apparatus. In a case where a time from confirmation of the scheduling information to notification is short, the scheduling information is difficult to be utilized.

In view of the above circumstances, an object of the present invention is to provide a transmission system, an electric power control apparatus, an electric power control method and a program capable of controlling a transmission apparatus such that power saving and low delay are achieved.

Solution to Problem

A transmission system according to one aspect of the present invention includes a first transmission apparatus that receives a data signal transmitted by a communication apparatus from a lower transmission apparatus sets the received data signal in a data unit, and transmits the data unit, a second transmission apparatus that receives the data unit transmitted by the first transmission apparatus, and an electric power controller that calculates an arrival start timing that is a timing at which the data unit including a data signal transmitted from a communication apparatus starts to arrive at the second transmission apparatus on a basis of a code rate and a size of a data transmission block used when the communication apparatus transmits the data signal, and performs control such that a sleep state of a signal processor that performs processing on the data unit in the second transmission apparatus is ended before the arrival start timing.

An electric power control apparatus according to one aspect of the present invention includes an electric power controller that calculates an arrival start timing that is a timing at which a data unit including a data signal transmitted by a communication apparatus starts to arrive at a second transmission apparatus on a basis of a code rate and a size of a data transmission block used when the communication apparatus transmits the data signal, the data unit being transmitted by a first transmission apparatus that receives a data signal transmitted by the communication apparatus from a lower transmission apparatus, and performs control such that a sleep state of a signal processor that performs processing on the data unit in the second transmission apparatus is ended before the arrival start timing.

An electric power control method according to one aspect of the present invention includes a transmission step in which a first transmission apparatus receives a data signal transmitted by a communication apparatus from a lower transmission apparatus sets the received data signal in a data unit, and transmits the data unit, a reception step in which a second transmission apparatus receives the data unit transmitted by the first transmission apparatus, and an electric power control step in which an electric power controller calculates an arrival start timing that is a timing at which the data unit including a data signal transmitted from a communication apparatus starts to arrive at the second transmission apparatus on a basis of a code rate and a size of a data transmission block used when the communication apparatus transmits the data signal, and performs control such that a sleep state of a signal processor that performs processing on the data unit in the second transmission apparatus is ended before the arrival start timing.

An electric power control method according to one aspect of the present invention includes a calculation step of calculating an arrival start timing that is a timing at which a data unit including a data signal transmitted by a communication apparatus starts to arrive at a second transmission apparatus on a basis of a code rate and a size of a data transmission block used when the communication apparatus transmits the data signal, the data unit being transmitted by a first transmission apparatus that receives a data signal transmitted by the communication apparatus from a lower transmission apparatus, and a power saving control step of performing control such that a sleep state of a signal processor that performs processing on the data unit in the second transmission apparatus is ended before the arrival start timing.

A program according to one aspect of the present invention is a program for causing a computer to function as the above-described electric power control apparatus.

Advantageous Effects of Invention

According to the present invention, a transmission apparatus can be controlled such that power saving and low delay are achieved.

BRIEF DESCRIPTION OF DRAWINGS

FIG. 6 is a diagram illustrating a modulation and coding scheme (MCS) table according to the first embodiment.

FIG. 7 is a diagram illustrating a code rate table according to the first embodiment.

FIG. 9 is a diagram illustrating a transport block size (TBS) table according to the first embodiment.

FIG. 10 is a diagram illustrating timings of transmission and arrival of uplink data according to a second embodiment.

FIG. 13 is a diagram illustrating a hardware configuration of a transfer apparatus and a distributed station according to the third embodiment.

FIG. 14 is a diagram illustrating a conventional power saving technique.

FIG. 15 is a diagram illustrating a conventional power saving technique.

DESCRIPTION OF EMBODIMENTS

Hereinafter, embodiments of the present invention will be described in detail with reference to the drawings.

First Embodiment

Figure 1:
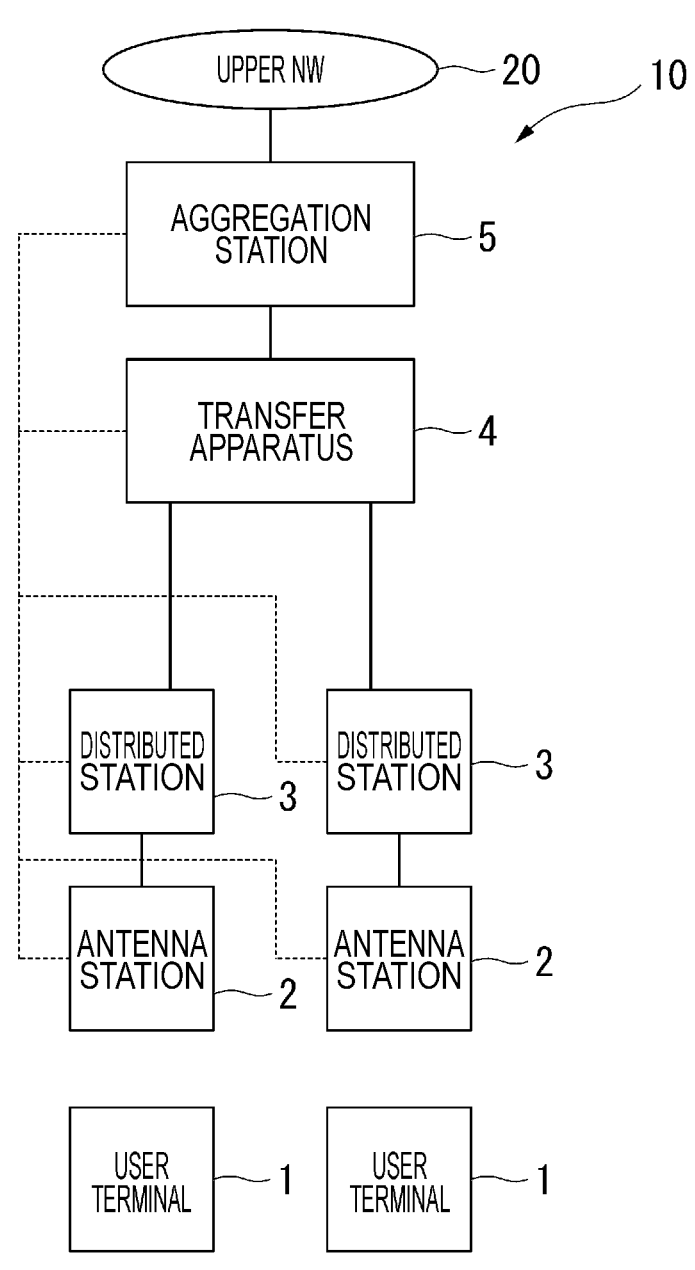
FIG. 1 is a configuration diagram illustrating a mobile NW system according to a first embodiment.

FIG. 1 is a diagram illustrating a configuration example of a mobile NW system 10 according to a first embodiment. The mobile NW system 10 is an example of a transmission system including a plurality of layered transmission apparatuses. The mobile NW system 10 is a mobile communication system of the 4th generation mobile communication system (4G) or the 5th generation mobile communication system (5G). The mobile NW system 10 includes user terminals 1, antenna stations 2, distributed stations 3, a transfer apparatus 4, and an aggregation station 5. The antenna stations 2, the distributed stations 3, the transfer apparatus 4, and the aggregation station 5 form a mobile NW. The aggregation station 5 is connected to an upper network (NW) 20. The numbers of the user terminals 1, the antenna stations 2, the distributed stations 3, the transfer apparatus 4, and the aggregation station 5 are freely set. FIG. 1 illustrates an example in which there are two user terminals 1, two antenna stations 2, and two distributed stations 3, and there is one transfer apparatus 4 and one aggregation station 5.

The user terminals 1, the antenna stations 2, the distributed stations 3, and the aggregation station 5 are 4G or 5G user equipment (UE), radio units (RUs), distributed stations (DUs), and a central unit (CU), respectively. The distributed stations 3 and the aggregation station 5 form a radio access network (RAN) apparatus such as an eNodeB (eNB) or a gNodeB (gNB). The eNB is a 4G long term evolution (LTE) base station. The gNB is a 5G new radio (NR) base station. A mobile fronthaul (MFH) is present between the antenna stations 2 and the distributed stations 3, a mobile midhaul (MMH) is present between the distributed stations 3 and the aggregation station 5, and a mobile backhaul (MBH) is present between the aggregation station 5 and the upper NW 20. A direction from the user terminals 1 to the upper NW 20 is described as uplink, and a direction from the upper NW 20 to the user terminals 1 is described as downlink.

The user terminals 1 and the antenna stations 2 wirelessly communicate with each other. The antenna stations 2 and the distributed stations 3, the distributed stations 3 and the transfer apparatus 4, and the transfer apparatus 4 and the aggregation station 5 are connected by wired transmission paths. In the present embodiment, a case where the antenna stations 2 and the distributed stations 3, the distributed stations 3 and the transfer apparatus 4, and the transfer apparatus 4 and the aggregation station 5 transmit and receive U-Plane data by an optical signal will be described as an example. In this case, the transmission paths are optical transmission paths such as optical fibers, and the transfer apparatus 4 is an optical gateway that relays an optical signal. Note that the antenna stations 2 and the distributed stations 3, the distributed stations 3 and the transfer apparatus 4, and the transfer apparatus 4 and the aggregation station 5 may transmit and receive U-Plane data by an electrical signal. In this case, the transfer apparatus 4 is, for example, a layer 2 switch or a router. The mobile NW system 10 further includes a transmission path for transmitting and receiving a control signal including a C-Plane signal and a cooperative transport interface (CTI) signal between apparatuses. The control signal between apparatus may be an electrical signal or an optical signal. A bearer signal in which U-Plane data is set and a control signal including a C-Plane signal may be logically separated and transmitted and received through the same transmission path.

The user terminals 1 each transmit and receive a radio signal to and from an antenna station 2 using radio resources allocated from the mobile NW. The radio resource allocated for transmission of an uplink signal includes resource blocks, a modulation scheme, a code rate, a transport block size (TBS), and the number of transmission layers. The resource blocks are represented by combinations of a channel and a time. Different frequencies are used for respective channels. Channels having continuous frequencies are used as the resource blocks. The time can be represented by the number of slots. A slot is a scheduler of data transmission and reception in a radio frame. The TBS is a size of a data block that is a unit in a case where processing such as data transmission is performed in a physical layer. The number of transmission layers represents the number of antennas used in a case where a radio signal is transmitted using multiple input multiple output (MIMO). In a case where the number of transmission layers is one, it indicates that the MIMO is not used.

The antenna stations 2 each wirelessly communicate with a user terminal 1. The antenna stations 2 each set uplink data wirelessly received from a user terminal 1 as an uplink signal, and transmit the uplink signal to an upper distributed station 3 via a wired transmission path. For example, the antenna stations 2 each down-convert radio uplink signals received by respective antenna elements (not illustrated) and then convert the signals into digital signals. After performing fast Fourier transform (FFT) on the uplink signals, the antenna stations 2 each multiply the uplink signals received by the respective antenna elements for respective channels by weight and add the uplink signals. The antenna stations 2 each convert an uplink signal obtained by aggregating the uplink signals for the respective channels from an electrical signal into an optical signal and output the optical signal to a transmission path with the distributed station 3.

The antenna stations 2 each receive a downlink signal from the upper distributed station 3 via the wired transmission path. The downlink signal includes downlink data addressed to the user terminal 1. The antenna stations 2 each wirelessly transmit the received downlink signal to the user terminal 1. For example, the antenna stations 2 each convert the received downlink signal from an optical signal into an electrical signal, and then convert the electrical signal into downlink signals to be transmitted from the respective antenna elements. The antenna stations 2 each perform inverse fast Fourier transform (IFFT) on the downlink signals for the respective antenna elements, convert the downlink signals from digital signals into analog signals, multiply the analog signals by weight for beamforming, and wirelessly transmit the analog signals from the corresponding antenna elements.

The distributed stations 3 each receive an uplink signal from a subordinate antenna station 2. The uplink signal received by a distributed station 3 includes uplink data received by the antenna station 2 from the subordinate user terminal 1. The distributed stations 3 each generate an uplink signal obtained by aggregating the uplink data, and transmit the generated uplink signal to the aggregation station 5 to which the own station is connected. The distributed stations 3 each receive a downlink signal in which downlink data addressed to the subordinate user terminal 1 is set from the aggregation station 5 to which the own station is connected. The distributed stations 3 each convert the received downlink signal into a downlink signal corresponding to a radio signal to be transmitted from each antenna station 2. The distributed stations 3 each transmit the downlink signal obtained by the conversion to the antenna station 2 that handles the downlink signal.

The transfer apparatus 4 is connected to the distributed stations 3 and the aggregation station 5. The transfer apparatus 4 transfers an uplink signal received from a distributed station 3 to the destination aggregation station 5 according to the transfer path. The transfer apparatus 4 transfers a downlink signal received from the aggregation station 5 to a destination distributed station 3 according to the transfer path.

The aggregation station 5 aggregates uplink signals received from the subordinate distributed stations 3 and transfers the uplink signal to the upper NW 20. The aggregation station 5 receives a downlink signal in which downlink data addressed to a user terminal 1 is set from the upper NW 20, and transfers the received downlink signal to a distributed station 3 connected to the destination user terminal 1.

Figure 2:
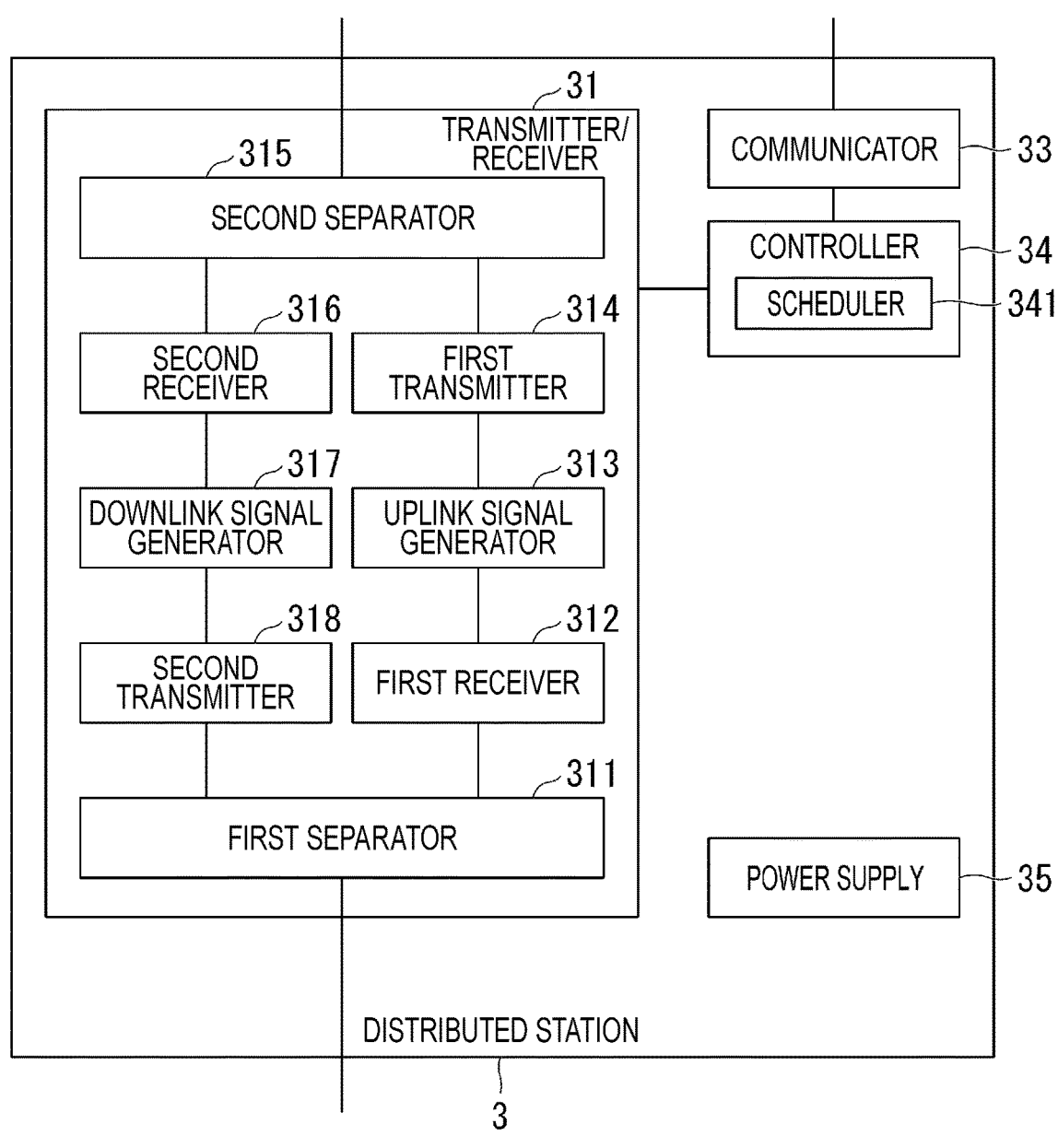
FIG. 2 is a diagram illustrating a configuration of a distributed station according to the first embodiment.

FIG. 2 is a block diagram illustrating a configuration of a distributed station 3. In FIG. 2, only functional blocks related to the present embodiment are extracted and illustrated. The distributed station 3 includes a transmitter/receiver 31, a communicator 33, a controller 34, and a power supply 35.

The transmitter/receiver 31 transmits and receives an optical signal. The transmitter/receiver 31 includes a first separator 311, a first receiver 312, an uplink signal generator 313, a first transmitter 314, a second separator 315, a second receiver 316, a downlink signal generator 317, and a second transmitter 318.

The first separator 311 separates an uplink signal and a downlink signal by wavelength. The first separator 311 outputs an uplink optical signal input from a transmission path with the antenna station 2 to the first receiver 312, and outputs a downlink optical signal input from the second transmitter 318 to the transmission path with the antenna station 2.

The first receiver 312 performs reception processing of an uplink signal. Specifically, the first receiver 312 converts the received uplink signal from an optical signal into an electrical signal. The first receiver 312 extracts an uplink signal of a channel and a time included in a resource block of a user terminal 1 for each user terminal 1 from a reception signal converted into an electrical signal. The first receiver 312 performs equalization, demodulation, and decoding on the extracted uplink signal to acquire uplink data. In a case where the first separator 311 receives uplink signals from a plurality of antenna stations 2 at different wavelengths, the distributed station 3 may include first receivers 312 corresponding to the respective antenna stations 2.

The uplink signal generator 313 sets the uplink data of each user terminal 1 input from the first receiver 312 to a protocol data unit (SDU) and generates an uplink signal addressed to the aggregation station 5. The SDU is a unit in which a protocol processes data. The uplink signal generator 313 outputs an uplink signal including the SDU to the first transmitter 314. The first transmitter 314 converts the uplink signal input from the uplink signal generator 313 from an electrical signal into an optical signal and outputs the optical signal to the second separator 315.

The second separator 315 separates an uplink signal and a downlink signal by wavelength. The second separator 315 outputs the uplink signal input from the first transmitter 314 to the transmission path with the transfer apparatus 4. The second separator 315 outputs a downlink signal input from the transmission path with the transfer apparatus 4 to the second receiver 316.

The second receiver 316 performs reception processing of a downlink signal. The second receiver 316 converts the downlink signal input from the second separator 315 from an optical signal into an electrical signal. The second receiver 316 acquires downlink data addressed to each user terminal 1 from the downlink signal converted into an electrical signal, and outputs the downlink data to the downlink signal generator 317. The downlink signal generator 317 generates a downlink signal to be transmitted from each antenna station 2. The downlink signal generator 317 sets the downlink data addressed to the user terminal 1 subordinate to the antenna station 2 in the downlink signal to be transmitted from the antenna station 2. The second transmitter 318 converts the downlink signal input from the downlink signal generator 317 from an electrical signal into an optical signal and outputs the optical signal to the first separator 311.

The communicator 33 transmits and receives a control signal to and from other apparatus including the antenna station 2, the transfer apparatus 4, and the aggregation station 5. The control signal includes a C-plane control signal and a CTI signal. The controller 34 controls the entire distributed station 3 in accordance with a control signal transmitted and received via the communicator 33. The controller 34 may set and transmit a control signal as an uplink signal or a downlink signal. In this case, the controller 34 outputs a control signal to the uplink signal generator 313, and the uplink signal generator 313 sets the control signal to an uplink signal. The controller 34 outputs a control signal to the downlink signal generator 317, and the downlink signal generator 317 sets the control signal to a downlink signal. The controller 34 may acquire a control signal from an uplink signal or a downlink signal. In this case, the first receiver 312 outputs the control signal included in the uplink signal to the controller 34, and the second receiver 316 outputs the control signal included in the downlink signal to the controller 34. The controller 34 includes a scheduler 341.

The scheduler 341 determines radio resources to be allocated to each user terminal 1. Therefore, the scheduler 341 receives a channel quality indicator (CQI) transmitted by each user terminal 1 from the antenna station 2 or the aggregation station 5 by a control signal. The CQI indicates the radio reception quality with the antenna station 2 measured by the user terminal 1. The scheduler 341 stores a resource determination model representing correspondence between the reception quality and radio resources in advance. The scheduler 341 determines radio resources to be allocated to the user terminal 1 using the value of the reception quality indicated by the received COI for an input of the resource determination model. The resource determination model may use other information in addition to the COI for an input. For example, the resource determination model may further use a data amount of uplink data in the user terminal 1. The scheduler 341 determines radio resources to be allocated to the user terminal 1 using the value of the reception quality indicated by the COI in notification from the user terminal 1 and the data amount of the uplink data for inputs of the resource determination model. The scheduler 341 notifies the aggregation station 5 of information of the radio resource allocated to the user terminal 1 by a control signal. The aggregation station 5 sets the information of the radio resource allocated to the user terminal 1 in a C-Plane control signal, and notifies the user terminal 1 of the information from the antenna station 2. The power supply 35 supplies power to each unit of the distributed station 3.

Figure 3:
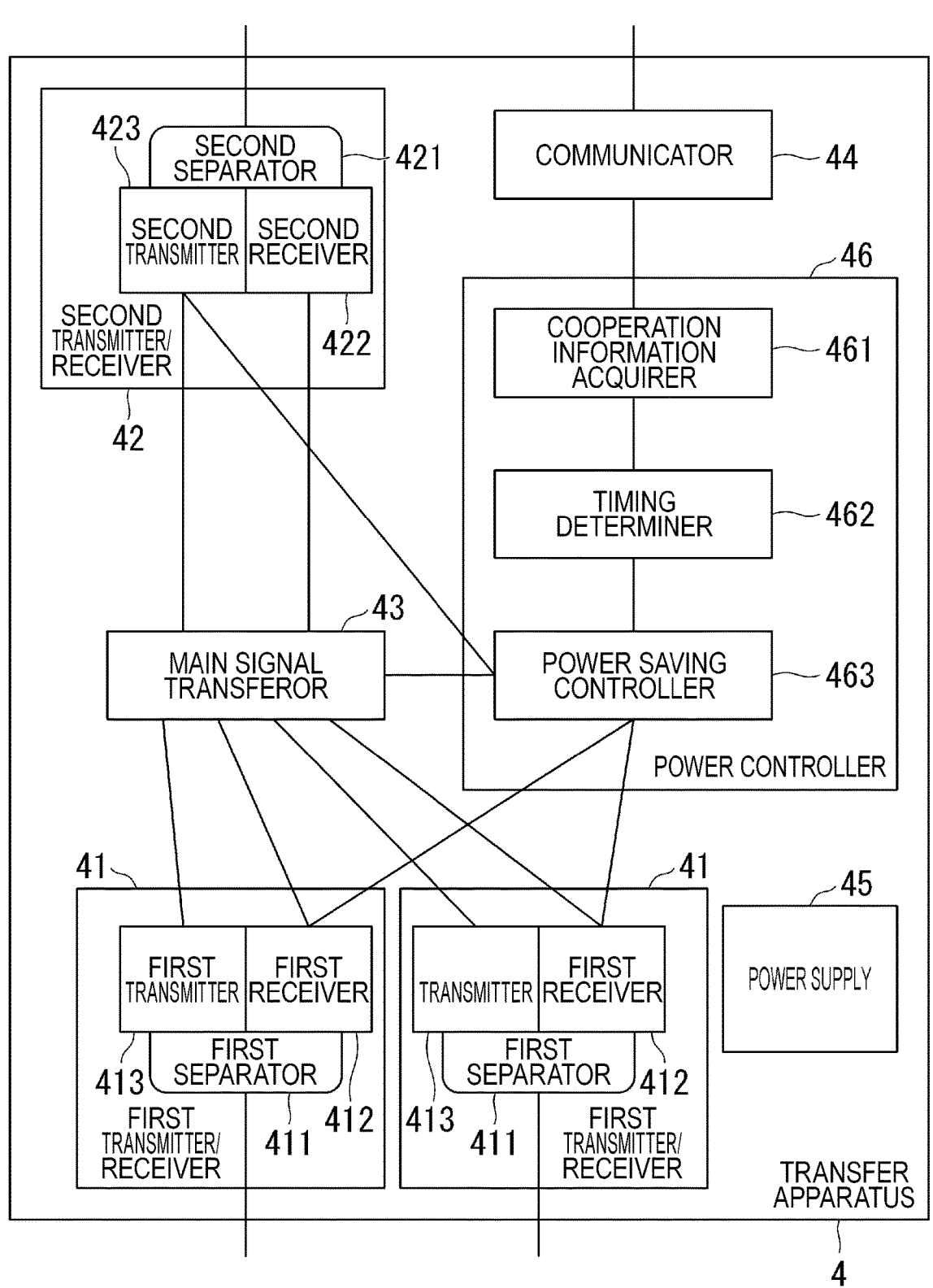
FIG. 3 is a diagram illustrating a configuration of a transfer apparatus according to the first embodiment.

FIG. 3 is a block diagram illustrating a configuration of the transfer apparatus 4 of the present embodiment. The transfer apparatus 4 includes first transmitters/receivers 41, a second transmitter/receiver 42, a main signal transferor 43, a communicator 44, a power supply 45, and an electric power controller 46.

The transfer apparatus 4 includes one or more first transmitters/receivers 41. The first transmitters/receivers 41 are connected to the distributed stations 3 via transmission paths. The first transmitters/receivers 41 each include a first separator 411, a first receiver 412, and a first transmitter 413. The first separator 411 separates an uplink signal and a downlink signal by wavelength. The first separator 411 inputs an optical signal transmitted through a transmission path with a distributed station 3, and outputs the input optical signal to the first receiver 412. The first separator 411 outputs a signal input from the first transmitter 413 to the transmission path with the distributed station 3. The first receiver 412 receives the optical signal from the first separator 411, transmits an optical signal having a preset wavelength, and outputs the optical signal to the main signal transferor 43. The first transmitter 413 receives the optical signal from the main signal transferor 43, transmits an optical signal having a preset wavelength, and outputs the optical signal to the transmission path with the distributed station 3. The first receiver 412 and the first transmitter 413 may amplify an optical signal, for example.

The transfer apparatus 4 includes one or more second transmitters/receivers 42. The second transmitters/receivers 42 are connected to the aggregation station 5 via a transmission path. The second transmitters/receivers 42 each include a second separator 421, a second receiver 422, and a second transmitter 423. The second separator 421 separates an uplink signal and a downlink signal by wavelength.

The second separator 421 inputs an optical signal transmitted through the transmission path with the aggregation station 5, and outputs the input optical signal to the second receiver 422. The second separator 421 outputs a signal input from the second transmitter 423 to the transmission path with the aggregation station 5. The second receiver 422 receives the optical signal from the second separator 421, transmits an optical signal having a preset wavelength, and outputs the optical signal to the main signal transferor 43. The second transmitter 423 receives the optical signal having the preset wavelength from the main signal transferor 43, transmits the optical signal having the preset wavelength, and outputs the optical signal to the second separator 421. The second receiver 422 and the second transmitter 423 may amplify an optical signal, for example.

The main signal transferor 43 outputs an optical signal having a predetermined wavelength input from any one of the first receivers 412 to any one of second transmitters 423 according to a preset transfer path. The main signal transferor 43 outputs an optical signal having a predetermined wavelength input from any one of the second receivers 422 to any one of the first transmitters 413 according to a preset transfer path. The wavelength set by each of the first receivers 412 and each of the second receivers 422, paths between the first receivers 412 and the second transmitters 423, and paths between the second receivers 422 and the first transmitters 413 are set in accordance with an instruction from a path control apparatus (not illustrated).

The communicator 44 transmits and receives a control signal to and from other apparatus including the antenna stations 2, the transfer apparatus 4, and the aggregation station 5. The power supply 45 supplies power to each unit of the transfer apparatus 4. The electric power controller 46 includes a cooperation information acquirer 461, a timing determiner 462, and a power saving controller 463. The cooperation information acquirer 461 acquires cooperation information of each of the user terminals 1 from the aggregation station 5. The cooperation information indicates radio resources allocated to the user terminals 1, and the antenna stations 2, the distributed stations 3, and the aggregation station 5 to which the user terminals 1 are connected. Note that the cooperation information acquirer 461 may receive some or all of the cooperation information from the distributed stations 3 or the antenna stations 2.

The timing determiner 462 calculates a timing at which the transfer apparatus 4 starts reception of an uplink signal and a timing at which the transfer apparatus 4 ends the reception on the basis of the cooperation information acquired by the cooperation information acquirer 461. The timing determiner 462 determines start and end timings of the sleep state of a controlled unit on the basis of the calculated timings. The controlled unit is a part or all of the first receivers 412, the second transmitters 423, and the main signal transferor 43. The sleep state is a state in which power supply from the power supply 45 to some circuits is cut off, and thus some functions cannot be executed. In the sleep state, power consumption is smaller than that in the active state. The active state is a state in which power supply from the power supply 45 to the circuits is not cut off, and all functions can be executed. The power saving controller 463 changes the state of the controlled unit according to the start timing and the end timing of the sleep state determined by the timing determiner 462.

In the present embodiment, a case where the distributed stations 3 each include the scheduler 341 will be described, but the distributed stations 3 may not each include the scheduler 341, and the transfer apparatus 4 may have a function similar to that of the scheduler 341.

Figure 16:
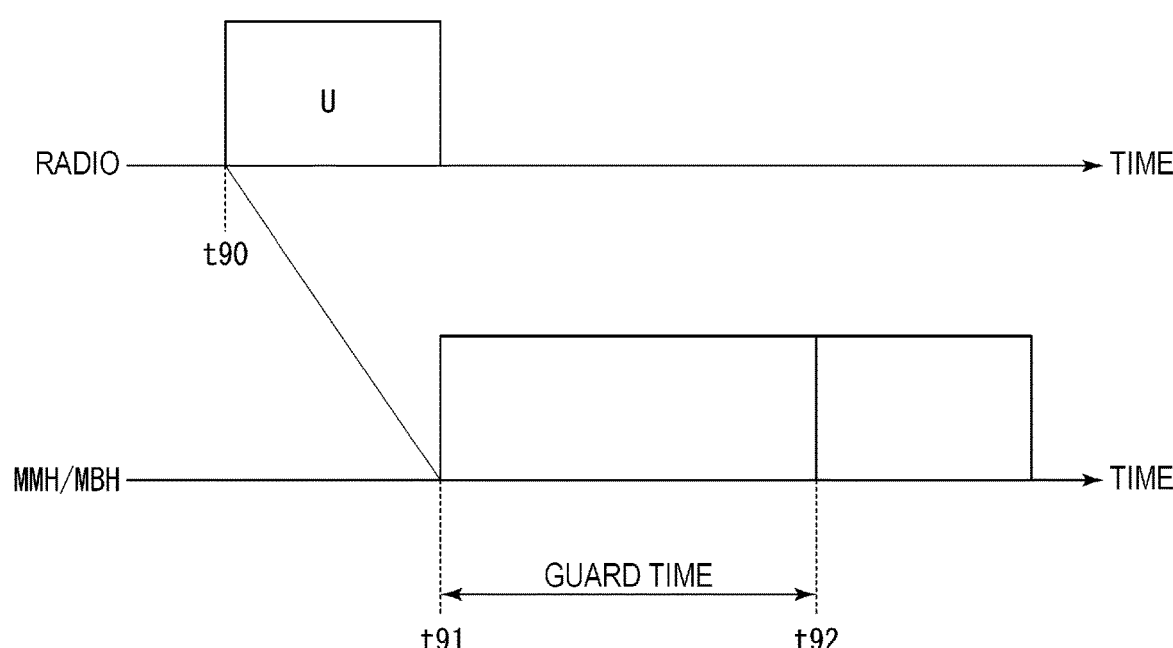
FIG. 16 is a diagram illustrating an arrival timing of uplink data in a conventional mobile NW system.

FIG. 16 is a diagram illustrating an arrival timing of uplink data in a conventional mobile NW system. Uplink data U wirelessly transmitted by a user terminal at time t90 is transmitted from an antenna station to a distributed station. The distributed station transmits an uplink signal in which the received uplink data U is set. Conventionally, the modulation degree of the uplink signal is unknown. Therefore, receivers of the U-Plane function in the MMH and MBH RAN apparatus set a guard time from arrival start time t91 of the uplink signal in a case where the maximum modulation degree is used to arrival end time t92 of the uplink signal in a case where the minimum modulation degree (and the minimum code rate) is used. Therefore, in a case where the modulation degree is unknown, the guard time is long. Since the receivers of the U-Plane function continue the Active state during the guard time, the power reduction effect is small.

The scheduler 341 of a distributed station 3 according to the present invention determines radio resources to be allocated to each user terminal 1 similarly to the conventional art. Specifically, the scheduler 341 schedules a timing, a modulation degree, a code rate, a frequency, and a data amount of data to be transmitted by each user terminal 1 in the radio section. The aggregation station 5 notifies the user terminal 1 of the scheduling result prior to transmission of a radio signal from the user terminal 1. These are transmitted from an antenna station 2 to the user terminal 1 by control messages called radio resource control (RRC) signaling and downlink control information (DCI). The user terminal 1 transmits a radio signal in which uplink data is set according to the allocated timing, modulation degree, code rate, frequency, and time according to these received control messages.

The scheduler 341 of the distributed station 3 receives a channel quality indicator (CQI) transmitted by the user terminal 1 from the aggregation station 5 or the antenna station 2 before allocating radio resources. The COI indicates quality of a radio channel measured in the user terminal 1. The scheduler 341 determines radio resources to be allocated to the user terminal 1 on the basis of the received COI and the resource determination model stored in advance. In a case where the power of the signal is stronger than noise, the radio quality is good. In a case where the radio quality is good, the scheduler 341 instructs the user terminal 1 to perform coding with a high modulation degree and a low redundancy degree. Thereby, a higher throughput can be achieved. Conversely, in a case where the radio quality is poor, the scheduler 341 instructs the user terminal 1 to perform coding with a low modulation degree and a high redundancy degree. Since the user terminal 1 can deliver a signal to the antenna station 2 with a higher probability accordingly, retransmission can be expected to be reduced. The scheduler 341 may determine radio resources to be allocated to the user terminal 1 by further using a buffer status report (BSR) in notification from the user terminal 1. The BSR indicates a buffer amount of uplink data in the user terminal 1. The scheduler 341 acquires the BSR from the aggregation station 5 or the antenna station 2.

In the radio section, a medium access control (MAC) frame is divided into a finer TBS and transmitted. In a case where coding with a high modulation degree and a low redundancy is used, the TBS can be set large. The larger the TBS, the faster the distributed station 3 can gather the number of information bits required to form a protocol data unit (PDU), which is a unit in which a protocol processes data. Therefore, a timing at which uplink data transmitted by the user terminal 1 arrives at the MMH is also made earlier. More specifically, a timing at which data is output from a radio link control (RLC) to a packet data convergence protocol (PDCP) and a timing at which data is output from the PDCP to an upper layer are made earlier.

On the other hand, for power saving control of the transfer apparatus 4, grasping the arrival start timing and the arrival end timing of uplink data traffic to the transfer apparatus 4 is important. This is because the power reduction effect is reduced in a case where the transfer apparatus 4 ends the sleep state and enters the active state before arrival of traffic, and delay increases in a case where the transfer apparatus 4 ends the sleep state later than arrival of traffic. Furthermore, delay of at least uplink data of which transmission has not ended occurs in a case where the transfer apparatus 4 starts the sleep state earlier than the end of arrival of traffic, and the power reduction effect is reduced in a case where the transfer apparatus 4 starts the sleep state after a time elapses from the end of arrival. Moreover, since a timing at which a PDU is constructed also varies depending on the TBS, a timing at which the uplink data arrives at the transfer apparatus 4 varies depending on not only the time of a resource block to be used but also the modulation degree and the code rate. Here, arrival means that the head of data is input to the transfer apparatus.

Therefore, the timing determiner 462 of the transfer apparatus 4 calculates a transmission start timing and a transmission end timing of uplink data in a distributed station 3 on the basis of the cooperation information acquired by the cooperation information acquirer 461 from the aggregation station 5. The timing determiner 462 calculates an arrival start timing and an arrival end timing of uplink data to the transfer apparatus 4 on the basis of the transmission start timing and the transmission end timing of the uplink data in the distributed station 3. The cooperation information includes the number of transmission layers (Tx Layers (MIMO)) in notification to the user terminal 1 by RRC signaling, and the modulation degree, the code rate, and the number of resource elements obtained on the basis of the DCI in notification to the user terminal 1. Furthermore, the cooperation information includes information of the antenna station 2, the distributed station 3, and the aggregation station 5 to which the user terminal 1 is connected. The modulation degree and the code rate are identified by an MCS index set in an MCS field of the DCI. The resource elements are calculated on the basis of the number of resource blocks and the transmission duration set in the DCI.

The timing determiner 462 calculates the TBS on the basis of the number of transmission layers, the modulation degree, the code rate, and the number of resource blocks allocated to the user terminal 1 for a radio transmission period at certain time. The timing determiner 462 determines whether uplink data of a data amount of one SDU can be obtained in one subframe on the basis of the TBS and the code rate. Note that one radio frame is 10 ms, and includes 10 subframes of 1 ms. One subframe includes one slot in a case where the subcarrier spacing is 15 kHz, two slots in a case where the subcarrier spacing is 30 kHz, four slots in a case where the subcarrier spacing is 60 kHz, and eight slots in a case where the subcarrier spacing is 120 kHz. One slot includes 14 symbols.

Figure 4:
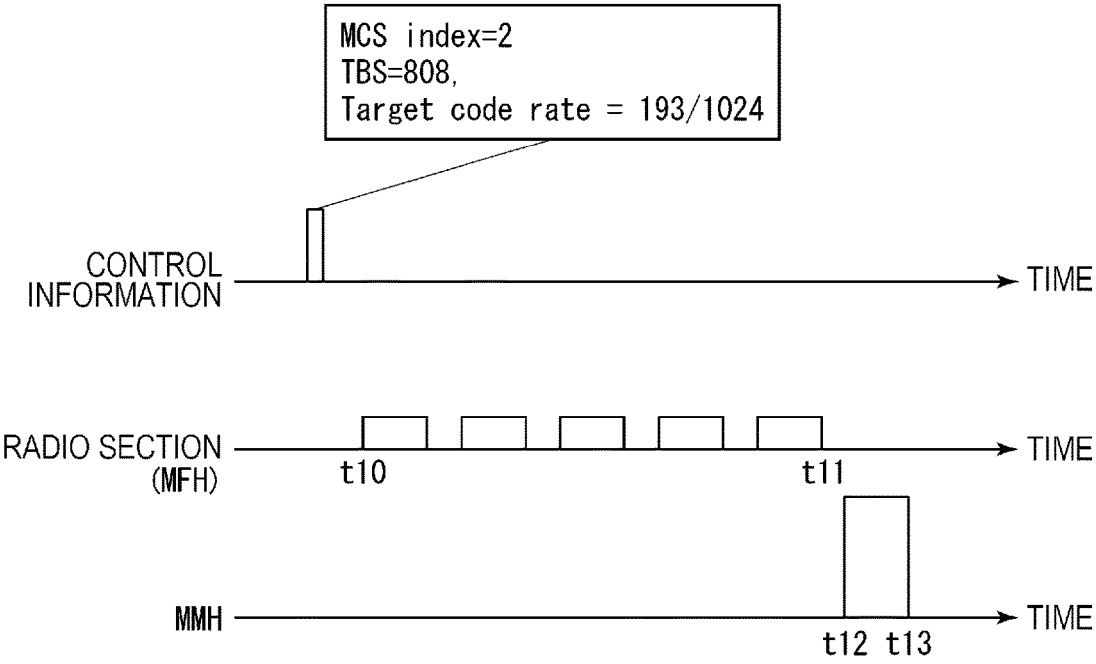
FIG. 4 is a diagram illustrating timings of transmission and arrival of uplink data according to the first embodiment.

FIG. 4 is a diagram illustrating timings of transmission and arrival of uplink data in a case where the uplink data amount of one subframe is less than the data amount of one SDU. Radio resources in uplink communication from time t10 are allocated to a user terminal 1 by a control signal. The time t10 is reference transmission start time of a radio frame. In a case where the uplink data amount of one subframe is less than the data amount of one SDU, a plurality of subframes needs to be received before a distributed station 3 transmits an SDU. Therefore, the timing determiner 462 calculates the number n of subframes necessary for receiving the data amount of one SDU. The timing determiner 462 sets time at which the user terminal 1 ends transmitting the nth subframe after transmitting the first subframe at the time t10 as t11.

The timing determiner 462 sets the time t11 as the transmission start time of the SDU in the distributed station 3. Note that the timing determiner 462 may add transmission delay from an antenna station 2 to the distributed station 3 to the time t11 and set the time as transmission start time of the SDU in the distributed station 3. The timing determiner 462 sets time t12 obtained by adding transmission delay from the distributed station 3 to the transfer apparatus 4 to the transmission start time t11 as arrival start time of the SDU to the transfer apparatus 4. The timing determiner 462 calculates transmission time of the SDU on the basis of the size of the SDU in which uplink data of n subframes is set and the transfer speed from the distributed station 3. The timing determiner 462 sets time obtained by adding the transmission time to the transmission start time t11 as transmission end time of the SDU from the distributed station 3. The timing determiner 462 sets time t13 obtained by adding the transmission delay from the distributed station 3 to the transfer apparatus 4 to the transmission end time of the SDU as arrival end time of the SDU to the transfer apparatus 4. Note that the timing determiner 462 may calculate the arrival end time t13 by adding the transmission time to the arrival start time t12.

Figure 5:
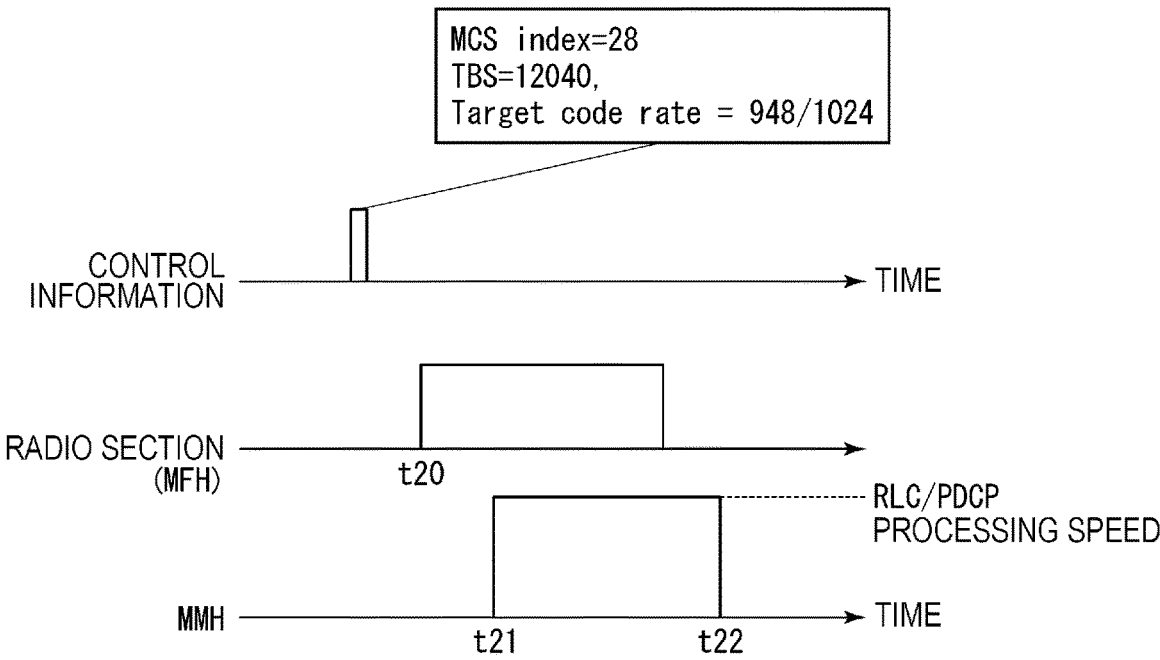
FIG. 5 is a diagram illustrating timings of transmission and arrival of uplink data according to the first embodiment.

FIG. 5 is a diagram illustrating timings of transmission and arrival of data in a case where the uplink data amount of one subframe is the data amount of one SDU. Physical resources in uplink communication from time t20 are allocated to a user terminal 1 by a control signal. In a case where the SDU can be transmitted by reception of one subframe, the timing determiner 462 of the transfer apparatus 4 sets time t21 obtained by adding transmission delay from a distributed station 3 to the transfer apparatus 4 to the time t20 at which the user terminal 1 transmits the subframe as arrival start time of the SDU to the transfer apparatus 4. Note that the timing determiner 462 may add transmission delay from an antenna station 2 to the distributed station 3 and the transmission delay from the distributed station 3 to the transfer apparatus 4 to the time t20 and set the time as the arrival start time t21. The timing determiner 462 calculates signal processing time on the basis of the size of the SDU and the RLC/PDCP processing speed in the distributed station 3. The timing determiner 462 sets time obtained by adding the signal processing time to the transmission start time t20 as transmission end time of the SDU from the distributed station 3. The timing determiner 462 sets time t22 obtained by adding the transmission delay from the distributed station 3 to the transfer apparatus 4 to the transmission end time of the SDU as arrival end time of the SDU to the transfer apparatus 4. Note that the timing determiner 462 may calculate the arrival end time t22 by adding the signal processing time to the arrival start time t21.

As described above, the time t12 and t21 is arrival start time in consideration of the modulation degree and the TBS, and the time t13 and t22 is arrival end time in consideration of the modulation degree and the TBS. As illustrated in FIG.

4 or 5, after calculating the arrival start time and the arrival end time of the SDU in the transfer apparatus 4, the timing determiner 462 determines start timing and end timing of the sleep state. The timing determiner 462 sets time earlier by T1 (T1≥0) than the arrival start time as the end timing of the sleep state. The timing determiner 462 sets time after T2 (T2≥0) from the arrival end time as the start timing of the sleep state.

The timing determiner 462 obtains the end timing and the start timing of the sleep state for each of the user terminals 1 as described above. The timing determiner 462 calculates a period obtained by excluding the end timing to the start timing of the sleep state of each of the user terminals 1 in the period in which the radio resources are to be allocated, and sets the period as a user terminal-specific sleep period. The timing determiner 462 calculates a logical product of user terminal-specific sleep periods of all the user terminals 1, and sets the calculated result as a transfer apparatus sleep period. The timing determiner 462 calculates, for each aggregation station 5, a logical product of user terminal-specific sleep periods of all user terminals 1 subordinate to the aggregation station 5, and sets the calculated result as an aggregation station-specific sleep period. The timing determiner 462 calculates, for each of the distributed stations 3, a logical product of user terminal-specific sleep periods of all user terminals 1 subordinate to the distributed station 3, and sets the calculated result as a distributed station-specific sleep period. The timing determiner 462 notifies the power saving controller 463 of the transfer apparatus sleep period, the aggregation station-specific sleep period for each aggregation station 5, and the distributed station-specific sleep period for each of the distributed stations 3. Note that the timing determiner 462 may use the transfer apparatus sleep period instead of the aggregation station-specific sleep period and the distributed station-specific sleep period.

The power saving controller 463 performs control such that the main signal transferor 43 enters the sleep state at the start time of the transfer apparatus sleep period, and the main signal transferor 43 enters the Wake state or the Active state at the end time of the transfer apparatus sleep period. The power saving controller 463 performs control such that the second transmitter 423 of the second transmitter/receiver 42 connected to the aggregation station 5 enters the sleep state at the start time of the aggregation station-specific sleep period of the aggregation station 5, and enters the Wake state or the Active state at the end time of the sleep period. The power saving controller 463 performs control such that the second transmitter 423 of the first transmitter/receiver 41 connected to a distributed station 3 enters the sleep state at the start time of the distributed station-specific sleep period of the distributed station 3, and enters the Wake state or the Active state at the end time of the sleep period.

Specific calculation examples of the arrival start timing and the arrival end timing in FIGS. 4 and 5 will be described. Here, conditions of the mobile NW system 10 are as follows. The system band is 20 MHZ (megahertz), and the subcarrier spacing is 15 kHz. One physical resource block (PRB) is 0.5 ms using seven orthogonal frequency division multiplexing (OFDM) symbols in the time direction and 12 subcarriers (180 kHz) in the frequency direction. The duplex system is frequency division duplex (FDD). The minimum unit of resource block allocation to a user terminal 1 is one RB unit in the frequency direction and two RB (radio subframe) units in the time direction. The user terminal 1 is instructed in advance to refer to an MCS table illustrated in FIG. 6 to be described below by prior RRC message exchange between the user terminal 1 and a distributed station 3.

Furthermore, it is instructed in advance that the number of MIMO layers used for uplink transmission is one by RRC message exchange between the user terminal 1 and the distributed station 3.

FIG. 6 is a diagram illustrating a modulation and coding scheme (MCS) table of the LTE. The MCS table illustrated in FIG. 6 is a table equivalent to the 3GPP TS 36.213 Table 8.6.1-1. The MCS table is information in which an MCS index ($I_{MCS}$), a modulation degree (modulation order) ($Q'_m$), a TBS index ($I_{TBS}$), and a redundancy version ($rv_{idx}$) are associated with each other. The MCS index is set in the DCI. The MCS index is information for identifying a combination of the modulation degree, the TBS index, and the redundancy version. The modulation degree represents a modulation scheme. The modulation degree "2" indicates quadrature phase shift keying (QPSK), the modulation degree "4" indicates 16 quadrature amplitude modulation (QAM), and the modulation degree "6" indicates 64 QAM. The TBS index identifies the TBS.

Figure 8:
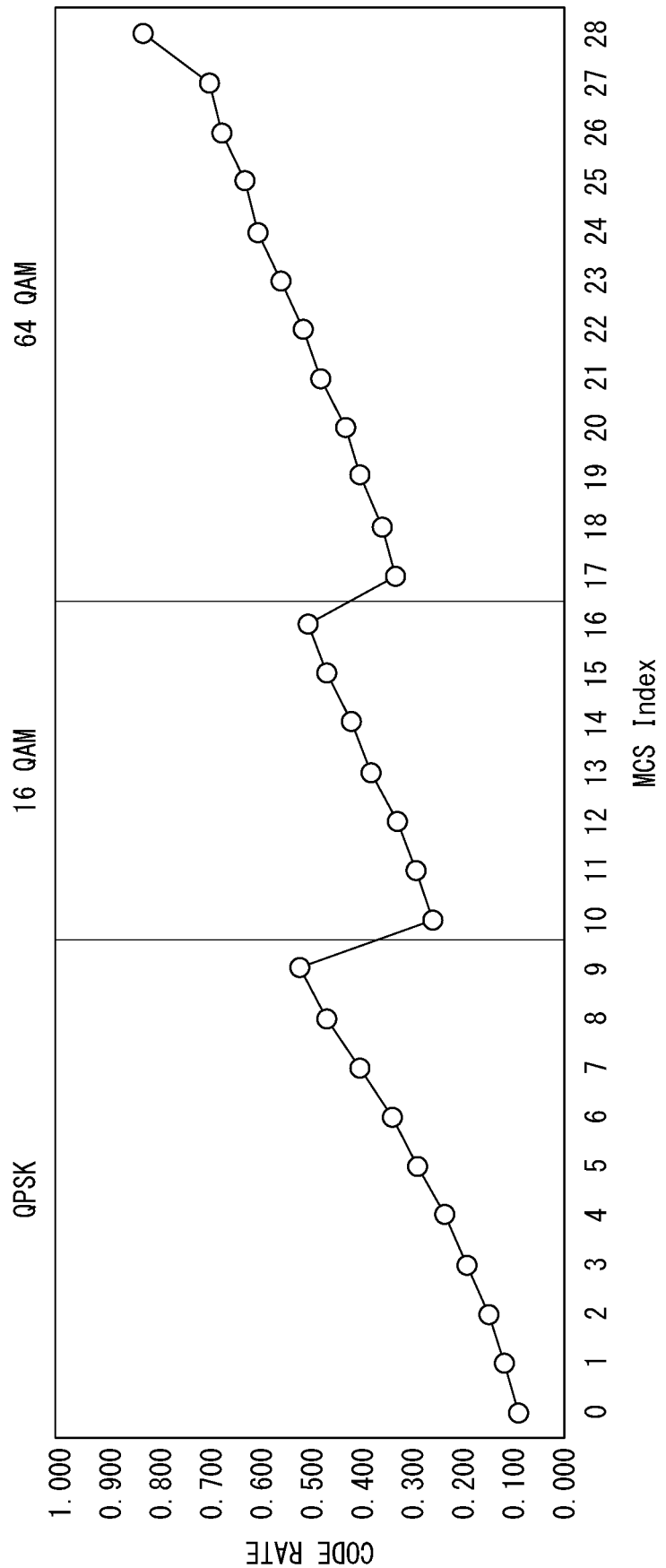
FIG. 8 is a diagram illustrating a relationship between an MCS index and a code rate according to the first embodiment.

FIG. 7 is a diagram illustrating a code rate table. FIG. 7 illustrates a code rate table of the LTE in a case where the system band is 20 MHz, the subcarrier spacing is 15 kHz, and the resource blocks are 100. The code rate table is information in which the MCS index ($I_{MCS}$), the TBS index ($I_{TBS}$), the modulation scheme (modulation), the TBS, the size of user data, and the code rate are associated with each other. FIG. 8 is a diagram illustrating a relationship between the MCS index and the code rate in the code rate table illustrated in FIG. 7.

FIG. 9 is a diagram illustrating a TBS table. The TBS table indicates TBSs defined by combinations of the TBS index ($I_{TBS}$) and the number of physical resource blocks ($N_{PRB}$).

In the case of FIG. 4, the scheduler 341 of the distributed station 3 determines the MCS index of the uplink transmission of the user terminal 1 at the time t10 as "2" from the reception strength and the error rate of an uplink signal in the radio section transmitted from the user terminal 1, and performs transmission to the user terminal 1 by a control signal. In this case, according to the MCS table illustrated in FIG. 4, the modulation degree indicating the modulation scheme is "2". That is, in the uplink communication from the user terminal 1, QPSK in which transmission of two bits per symbol is possible is used for the modulation scheme. Similarly, the TBS index is also determined to be "2".

Further, the scheduler 341 is assumed to allocate 50 physical resource blocks (PRBs) to the user terminal 1 ($N_{PRB}$=50) on the basis of the uplink data amount indicated by a BSR transmitted from the user terminal 1 in advance, the congestion degree in resource blocks managed by the distributed station 3, and the like. According to the TBS table illustrated in FIG. 9, the TBS is 2216 bits (277 bytes) corresponding to the MCS index=2 and the $N_{PRB}$=50.

Furthermore, the ratio of redundant bits is determined by the code rate described in the code rate table of FIG. 7. That is, the substantial (significant) number of bits in a subframe transmitted from the user terminal 1 is further reduced. Assuming that one SDU is 1500 bytes, in a case of the above-described conditions, five or more subframes are required in the time direction. Therefore, the distributed station 3 starts outputting an uplink signal to the MBH by combining data of a plurality of transport blocks after at least five subframes from the start of reception of the first subframe from the antenna station 2.

The timing determiner 462 of the transfer apparatus 4 sets time at which the distributed station 3 ends reception of five subframes as the transmission start time t11 of the SDU from the distributed station 3. The timing determiner 462 sets time obtained by adding the transmission delay from the distributed station 3 to the transfer apparatus 4 to the transmission start time t11 of the SDU from the distributed station 3 as the arrival start time t12 of the SDU to the transfer apparatus 4. The timing determiner 462 sets the time t13 at which a transmission time calculated on the basis of the size of the SDU and the transfer speed from the distributed station 3 has elapsed from the arrival start time t12 of the SDU in the transfer apparatus 4 as the arrival end time of the SDU. The timing determiner 462 determines a sleep time such that the sleep state is ended before the arrival start time t12 and the sleep state is started after the SDU arrival end time t13.

In the case of FIG. 5, the scheduler 341 of the distributed station 3 determines the MCS index of the uplink transmission of the user terminal 1 at the time t20 as "28", and performs transmission to the user terminal 1 by a control signal. In a case where the MCS index is "28", the TBS index is "26". According to the TBS table illustrated in FIG. 9, in a case where the MCS index is "26" and 50 physical resource blocks are allocated to the user terminal 1, the TBS is 36696 bits (4587 bytes). That is, one SDU can be transmitted in one subframe. The timing determiner 462 of the transfer apparatus 4 sets the time t21 obtained by adding the transmission delay from the distributed station 3 to the transfer apparatus 4 to the time t20 at which the user terminal 1 transmits the first subframe as the arrival start time of the SDU to the transfer apparatus 4. The timing determiner 462 sets the time t22 obtained by adding the time obtained by adding the signal processing time in the distributed station 3 to the time t20 and the transmission delay from the distributed station 3 to the transfer apparatus 4 as the arrival end time of the SDU to the transfer apparatus 4. Similarly to the above, the timing determiner 462 determines the end time and the start time of sleep on the basis of the arrival start time and the arrival end time.

Second Embodiment

In the present embodiment, the sleep state of a transfer apparatus is controlled on the basis of a subframe in a radio section to which an uplink is allocated. The present embodiment will be described focusing on a difference from the first embodiment. The configuration of a mobile NW system of the present embodiment is similar to that of the first embodiment.

Figure 10:
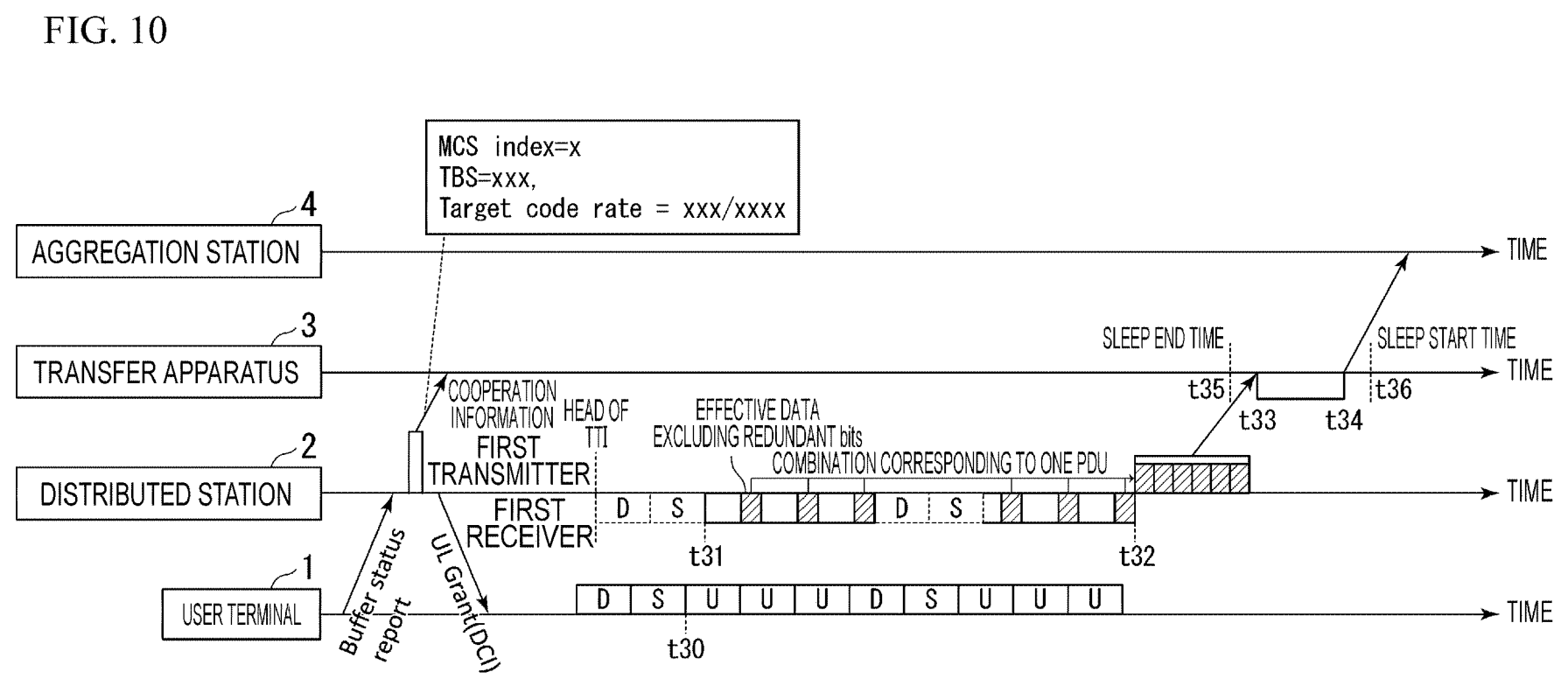

FIG. 10 is a diagram illustrating timings of transmission and arrival of uplink data in a mobile NW system 10. A user terminal 1 transmits a buffer status report (BSR) in addition to a CQI by a control signal. A scheduler 341 of a distributed station 3 determines radio resources to be allocated to the user terminal 1 on the basis of the CQI and BSR transmitted from the user terminal 1. For example, the scheduler 341 determines the MCS index as "2". The distributed station 3 notifies the user terminal 1 of DCI in which information of the determined radio resources is set by UL grant. A controller 34 of the distributed station 3 notifies a transfer apparatus 4 of cooperation information based on the radio resources allocated to the user terminal 1.

Similarly to TDD_config in the LTE, subframes of radio communication between the user terminal 1 and an antenna station 2 are set by repetition of DSUUU. The uplink of time division duplex (TDD) in a subframe is described as U, the downlink is described as D, and a special subframe at the time of switching is described as S. The head of the radio frame corresponds to the head of a transmission time interval (TTI).

The data amount of each subframe is determined by a modulation degree. Effective uplink data excluding the redundant bits of uplink data received by each subframe is determined by a code rate. A transmitter/receiver 31 of the distributed station 3 acquires effective uplink data of one PDU from an uplink signal from the antenna station 2, sets the uplink data in the PDU, and transmits the uplink data to the transfer apparatus 4. The PDU is a data transmitter/receiver in a certain protocol.

Therefore, a timing determiner 462 of the transfer apparatus 4 calculates the effective data amount acquired from each subframe on the basis of the modulation degree and the code rate determined by the MCS index. The timing determiner 462 calculates the number of subframes for obtaining the data amount of one PDU on the basis of the data size of the PDU and the effective data amount obtained in one subframe. The timing determiner 462 determines that the distributed station 3 transmits the PDU after the end of reception of subframes of the calculated number of subframes.

For example, in a case where the MCS is "2" under the similar conditions as in the first embodiment and FIG. 4, the PDU data addressed to an aggregation station 5 is transmitted from the distributed station 3 seven subframes after the head uplink data of the PDU arrives at the distributed station 3. Note that FIG. 10 illustrates a case where the PDU data addressed to the aggregation station 5 is transmitted from the distributed station 3 after six subframes from a subframe in which the head uplink data of the PDU is set. The uplink data transmitted by the user terminal 1 at time t30 arrives at the distributed station 3 at time t31. The timing determiner 462 of the transfer apparatus 4 calculates the time t30 on the basis of the resource blocks allocated to the user terminal 1. The timing determiner 462 calculates the time t31 by adding one-way delay from the antenna station 2 to the distributed station 3 to the time t30.

Further, the timing determiner 462 calculates time t32 at which the uplink data of one PDU is gathered in a distributed station 6 on the basis of cooperation information and the PDU size. In FIG. 10, the timing determiner 462 sets reception end time of the sixth subframe of the uplink data from the time t31 as the time t32. The timing determiner 462 sets time t33 obtained by adding transmission delay from the distributed station 3 to the transfer apparatus 4 to the time t32 at which the distributed station 6 transmits the first uplink data of the PDU as arrival start time of the SDU to the transfer apparatus 4.

The timing determiner 462 calculates time t34 at which the transfer apparatus 4 ends reception of the uplink data of one PDU of which transmission is started by the distributed station 3 at the time t32 on the basis of the PDU size, the link speed of the transmission path between the distributed station 6 and the transfer apparatus 4, and the one-way delay. That is, the timing determiner 462 calculates a transmission time of one PDU on the basis of the size of the PDU and the transfer speed between the distributed station 3 and the transfer apparatus 4. The timing determiner 462 calculates the arrival end time t34 of the PDU to the transfer apparatus 4 by adding a transmission time of the SDU to the time t33.

The timing determiner 462 sets time earlier by T3 (T3≥0) than the arrival start time t33 as the end timing of the sleep state, and sets time after T4 (T4≥0) from the arrival end time t34 as the start timing of the sleep state. As a result, the transfer apparatus 4 can end the sleep state earlier than arrival of an uplink optical signal, and receive data of the PDU and transfer the data to the aggregation station 5 without giving delay due to sleep. Furthermore, in the transfer apparatus 4, the higher power saving effect can be expected.

Note that the distributed station 3 may start transmission of the PDU earlier than the end of reception of the data of one PDU from the antenna station 2. For example, in a case where six uplink subframes need to be received in order to form the PDU as described above, the distributed station 3 may start to transmit the PDU to the transfer apparatus 4 before reception of the sixth subframe ends. However, the distributed station 3 starts transmission of the PDU at such a timing that the transmission of the PDU ends after the reception of the six uplink subframes ends.

Note that the timing determiner 462 may determine the arrival start timing of the PDU to the transfer apparatus 4 on the basis of the head timing of the TTI and the position of an uplink subframe in the radio frame. That is, the timing determiner 462 may calculate the arrival start time and the arrival end time of the PDU in the transfer apparatus 4 using time at which the head of the TTI arrives at the distributed station 3 and the position of the first uplink radio frame in the radio frame. When calculating the arrival start time, the timing determiner 462 assumes the maximum modulation degree that can be taken in the mobile NW system 10. The timing determiner 462 sets the modulation degree and the code rate used for calculating the arrival end time as the minimum modulation degree and the minimum code rate that can be taken in the mobile NW system 10.

Third Embodiment

In the present embodiment, a distributed station includes an electric power controller. The present embodiment will be described focusing on differences from the above-described first and second embodiments.

Figure 11:
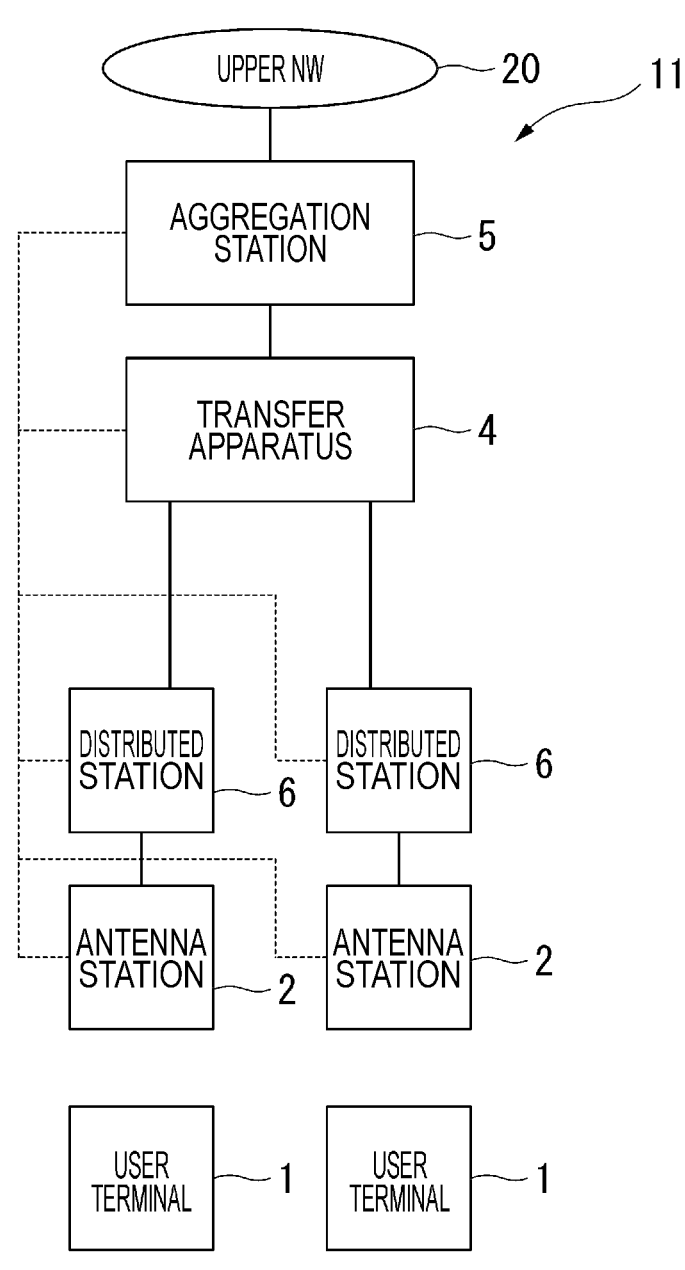
FIG. 11 is a configuration diagram illustrating a mobile NW system according to a third embodiment.

FIG. 11 is a diagram illustrating a configuration of a mobile NW system 11 according to the present embodiment. In FIG. 11, the same components as those of the mobile NW system 10 according to the first embodiment illustrated in FIG. 1 are denoted by the same reference numerals, and the description thereof will be omitted. The mobile NW system 11 is different from the mobile NW system 10 of the first embodiment in that distributed stations 6 are included instead of the distributed stations 3.

Figure 12:
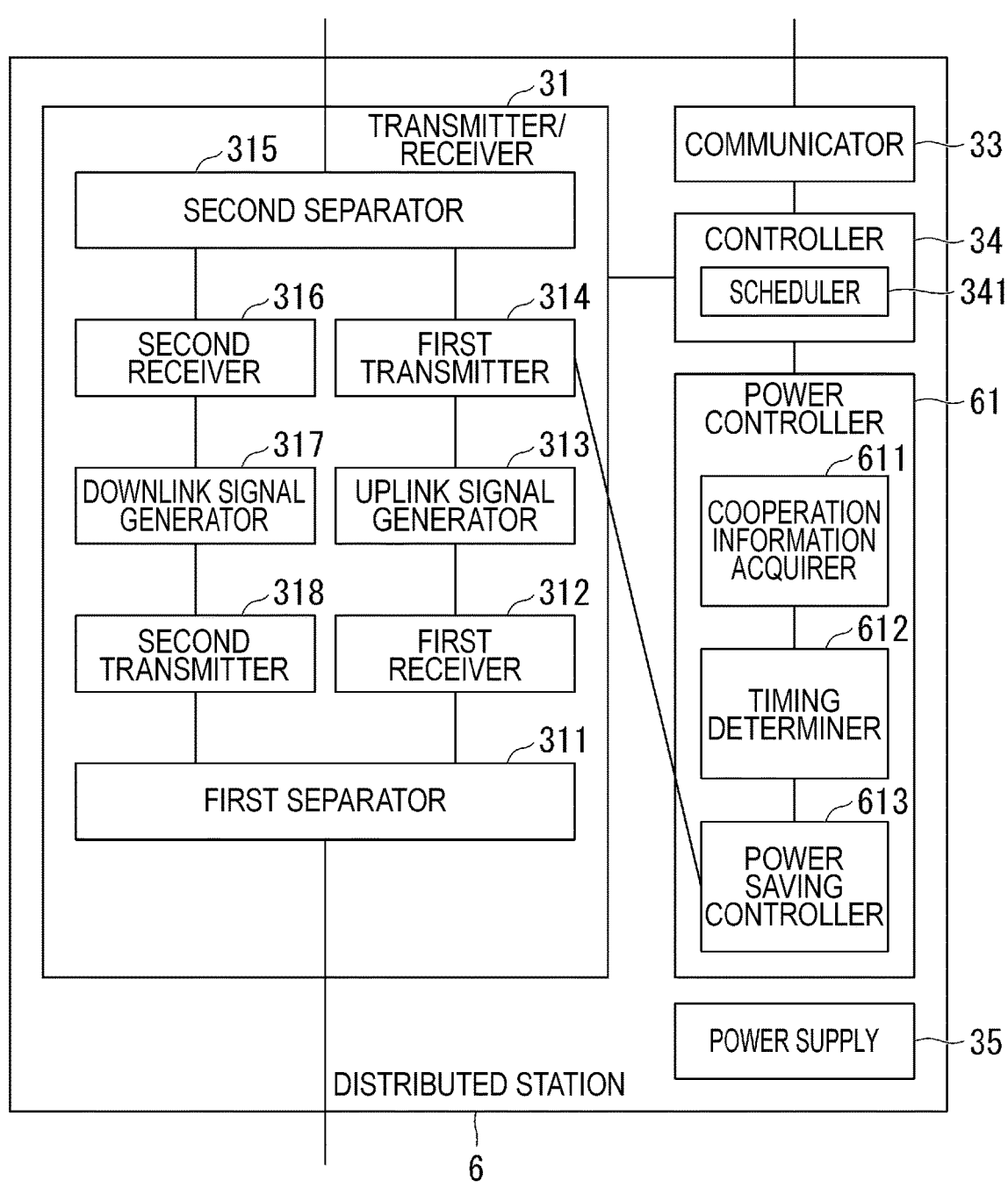
FIG. 12 is a diagram illustrating a configuration of a distributed station according to the third embodiment.

FIG. 12 is a block diagram illustrating a configuration of a distributed station 6. In FIG. 12, the same components as those of the distributed station 3 according to the first embodiment illustrated in FIG. 2 are denoted by the same reference numerals, and the description thereof will be omitted. The distributed station 6 is different from the distributed station 3 of the first embodiment in that the distributed station 6 further includes an electric power controller 61.

The electric power controller 61 includes a cooperation information acquirer 611, a timing determiner 612, and a power saving controller 613. The cooperation information acquirer 611 acquires cooperation information similar to a cooperation information acquirer 461 included in an electric power controller 46 of a transfer apparatus 4 for a user terminal 1 subordinate to the own station from a control signal received from another apparatus or a scheduler 341.

The timing determiner 612 calculates transmission start time and transmission end time from the distributed station 3 for each user terminal 1 subordinate to the own station on the basis of the cooperation information acquired by the cooperation information acquirer 611 by processing similar to a timing determiner 462 included in the electric power controller 46 of the transfer apparatus 4. The timing determiner 612 sets time earlier by T5 (T5≥0) than the transmission start time as the end timing of the sleep state, and sets time after T6 (T6≥0) from the transmission end time as the start timing of the sleep state. The timing determiner 612 calculates a period obtained by excluding the end timing to the start timing of the sleep state of each user terminal 1, and sets the period as a user terminal-specific sleep period. The timing determiner 612 calculates a logical product of the user terminal-specific sleep period calculated for the subordinate user terminal 1, and sets the calculated result as a transmission sleep period. The timing determiner 612 outputs the calculated transmission sleep period to the power saving controller 613.

The power saving controller 613 changes the state of a first transmitter 314 according to the start timing and the end timing of the transmission sleep state determined by the timing determiner 612. The power saving controller 613 performs control such that the first transmitter 314 enters the sleep state at the start time of the sleep period, and the first transmitter 314 enters the Wake state or the Active state at the end time of the sleep period.

Note that, in a case where the code rate is low, the timing determiner 462 may make the times T2 and T4 longer in consideration of retransmission. For example, the timing determiner 462 makes the times T2 and T4 longer as the code rate is lower. Similarly, in a case where the code rate is low, the timing determiner 612 may make the time T5 longer.

In the above-described embodiments, the timing determiner 462 uses an MCS index in notification to each user terminal 1 when calculating the sleep end timing and the sleep start timing. However, the timing determiner 462 may acquire the maximum MCS index and the minimum index for each distributed station 3 of the MCS index in notification to each user terminal 1. When calculating the arrival start time of uplink data in the transfer apparatus 4 for each user terminal 1 subordinate to the distributed station 3, the timing determiner 462 uses the maximum MCS index obtained for the distributed station 3. When calculating the arrival end time for each user terminal 1 subordinate to the distributed station 3, the timing determiner 462 uses the minimum MCS index obtained for the distributed station 3. The same applies to the timing determiner 612.

In the above description, the timing determiner 462 acquires the MCS index in notification to the user terminal 1, but may acquire the COI or the COI and the uplink data amount in notification from the user terminal 1. The timing determiner 462 estimates radio resources using a resource determination model similar to that of the scheduler 341 and the CQI or the COI and the uplink data amount in notification. The timing determiner 462 performs processing similar to the above using the estimated radio resources as cooperation information. As a result, the timing determiner 462 can start calculation of start and end timings of the sleep state before the COI of the user terminal 1 is determined. The same applies to the timing determiner 612.

Furthermore, in the above embodiment, the timing determiner 462 calculates user terminal-specific sleep periods for all user terminals 1, but may calculate a user terminal-specific sleep period for a user terminal 1 having high priority. For the timing determiner 462, the aggregation station 5 outputs cooperation information to the transfer apparatus 4 only for a user terminal 1 having high priority. Alternatively, the transfer apparatus 4 acquires information of the user terminal 1 having high priority from the aggregation station 5. The same applies to the timing determiner 612.

A hardware configuration example of the transfer apparatus 4 and the distributed station 6 will be described. FIG. 13 is an apparatus configuration diagram illustrating a hardware configuration example of the transfer apparatus 4 and the distributed station 6. The transfer apparatus 4 and the distributed station 6 each include a processor 71, a storage 72, a communication interface 73, a user interface 74, and a power supply apparatus 75.

The processor 71 is a central processing apparatus that performs calculation and control. The processor 71 is a CPU, for example. The processor 71 reads and executes the program from the storage 72. Some of the functions of the electric power controller 46 of the transfer apparatus 4, the electric power controller 61 of the distributed station 6, and the controller 34 may be implemented by using hardware such as an application specific integrated circuit (ASIC), a programmable logic device (PLD), or a field programmable gate array (FPGA). The storage 72 further includes a work area and the like to be used when the processor 71 executes various programs. The communication interface 73 is communicably connected to another apparatus. The communication interface 73 corresponds to the first transmitter/receiver 41, the second transmitter/receiver 42, the main signal transferor 43, and the communicator 44 of the transfer apparatus 4, and the transmitter/receiver 31 and the communicator 33 of the distributed station 6. The user interface 74 is an input apparatus such as a keyboard, a pointing apparatus (a mouse, a tablet, etc.), buttons, a touch panel, or a display apparatus such as a display. Manual operations are input through the user interface 74. The power supply apparatus 75 supplies power to each unit.

Note that although the transfer apparatus 4 includes the electric power controller 46 in the above-described embodiments, an electric power control apparatus connected to the transfer apparatus 4 may include the electric power controller 46. Similarly, the distributed station 6 includes the electric power controller 61 in the above-described embodiments, but an electric power control apparatus connected to the distributed station 6 may include the electric power controller 61. The electric power control apparatus including the electric power controller 46 and the electric power control apparatus including the electric power controller 61 may be the same apparatus. The hardware configuration of the electric power control apparatus is similar to that in FIG. 13.

The electric power control apparatus may be implemented by a plurality of computer apparatus connected to a network. In this case, which of the plurality of computer apparatus implements each functional unit of the electric power control apparatus can be freely set. The same functional unit may be implemented by a plurality of computer apparatus.

According to the above-described embodiments, a transmission system includes a first transmission apparatus, a second transmission apparatus, and an electric power controller. For example, the transmission system is the mobile NW system 10 of the embodiments, the first transmission apparatus is the distributed station 3 of the embodiments, and the second transmission apparatus is the transfer apparatus 4 of the embodiments. The first transmission apparatus receives a data signal transmitted by a communication apparatus from a lower transmission apparatus sets the received data signal in a data unit, and transmits the data unit. The communication apparatus is, for example, the user terminal 1 of the embodiments. The second transmission apparatus receives the data unit transmitted by the first transmission apparatus. The second transmission apparatus includes a signal processor that performs processing on the data unit. The signal processor is, for example, the first receiver 412, the main signal transferor 43, or the second transmitter 423 of the embodiments. The electric power controller calculates an arrival start timing that is a timing at which the data unit including a data signal transmitted from a communication apparatus starts to arrive at the second transmission apparatus on the basis of a code rate and a size of a data transmission block used when the communication apparatus transmits the data signal. The electric power controller performs control such that a sleep state of a signal processor of the second transmission apparatus is ended before the arrival start timing.

The electric power controller calculates an arrival end timing that is a timing at which the data unit including the data signal transmitted by the communication apparatus ends arrival at the second transmission apparatus on the basis of the code rate and a size of the data transmission block, and an amount of data transmitted by the data unit. The controller performs control such that a sleep state of the signal processor of the second transmission apparatus is started after the arrival end timing.

The communication apparatus wirelessly transmits the data unit. The electric power controller acquires the code rate and a size of the data transmission block on the basis of a modulation and coding scheme (MCS) index in notification to the communication apparatus. Alternatively, the electric power controller acquires the code rate and a size of the data transmission block on a basis of radio reception quality in the communication apparatus.

Although the embodiments of the present invention have been described in detail with reference to the drawings, specific configurations are not limited to the embodiments and include design and the like within the scope of the present invention without departing from the gist of the present invention.

REFERENCE SIGNS LIST

1 User terminal
2 Antenna station
3 Distributed station
4 Transfer apparatus
5 Aggregation station
6 Distributed station
10, 11 Mobile NW system
31 Transmitter/receiver
33, 44 Communicator
34 Controller
35, 45 Power supply
41 First transmitter/receiver
42 Second transmitter/receiver
43 Main signal transferor
46, 61 Electric power controller
71 Processor
72 Storage
73 Communication interface
74 User interface
75 Power supply apparatus
311, 411 First separator
312, 412 First receiver
313 Signal generator
314, 413 First transmitter
315, 421 Second separator
316, 422 Second receiver

317 Signal generator
318, 423 Second transmitter
341 Scheduler
461, 611 Cooperation information acquirer
462, 612 Timing determiner
463, 613 Power saving controller

The invention claimed is:

1. A transmission system comprising:
a first transmission apparatus that receives a data signal transmitted by a communication apparatus from a lower transmission apparatus sets the received data signal in a data unit, and transmits the data unit;
a second transmission apparatus that receives the data unit transmitted by the first transmission apparatus; and
an electric power controller that calculates an arrival start timing that is a timing at which the data unit including a data signal transmitted from a communication apparatus starts to arrive at the second transmission apparatus on a basis of a code rate and a size of a data transmission block used when the communication apparatus transmits the data signal, and performs control such that a sleep state of a signal processor that performs processing on the data unit in the second transmission apparatus is ended before the arrival start timing.

2. An electric power control apparatus comprising
an electric power controller that calculates an arrival start timing that is a timing at which a data unit including a data signal transmitted by a communication apparatus starts to arrive at a second transmission apparatus on a basis of a code rate and a size of a data transmission block used when the communication apparatus transmits the data signal, the data unit being transmitted by a first transmission apparatus that receives a data signal transmitted by the communication apparatus from a lower transmission apparatus, and performs control such that a sleep state of a signal processor that performs processing on the data unit in the second transmission apparatus is ended before the arrival start timing.

3. The electric power control apparatus according to claim 2,
wherein the electric power controller calculates an arrival end timing that is a timing at which the data unit including the data signal transmitted by the communication apparatus ends arrival at the second transmission apparatus on a basis of the code rate and a size of the data transmission block, and an amount of data transmitted by the data unit, and performs control such that a sleep state of the signal processor is started after the arrival end timing.

4. The electric power control apparatus according to claim 3,
wherein the communication apparatus wirelessly transmits the data unit, and
the electric power controller acquires the code rate and a size of the data transmission block on a basis of a modulation and coding scheme (MCS) index in notification to the communication apparatus.

5. The electric power control apparatus according to claim 3,
wherein the communication apparatus wirelessly transmits the data unit, and
the electric power controller acquires the code rate and a size of the data transmission block on a basis of radio reception quality in the communication apparatus.

6. The electric power control apparatus according to claim 2,
wherein the communication apparatus wirelessly transmits the data unit, and
the electric power controller acquires the code rate and a size of the data transmission block on a basis of a modulation and coding scheme (MCS) index in notification to the communication apparatus.

7. The electric power control apparatus according to claim 2,
wherein the communication apparatus wirelessly transmits the data unit, and
the electric power controller acquires the code rate and a size of the data transmission block on a basis of radio reception quality in the communication apparatus.

8. A transmission control method comprising:
receiving, by a first transmission apparatus, a data signal transmitted by a communication apparatus from a lower transmission apparatus, setting the received data signal in a data unit, and transmitting the data unit;
receiving, by a second transmission apparatus, the data unit transmitted by the first transmission apparatus; and
calculating, by an electric power controller, an arrival start timing that is a timing at which the data unit including a data signal transmitted from a communication apparatus starts to arrive at the second transmission apparatus on a basis of a code rate and a size of a data transmission block used when the communication apparatus transmits the data signal, and performing control such that a sleep state of a signal processor that performs processing on the data unit in the second transmission apparatus is ended before the arrival start timing.

* * * * *